United States Patent
Braunstein

(10) Patent No.: US 7,600,350 B2
(45) Date of Patent: Oct. 13, 2009

(54) THERMALLY BROKEN SUNSHADE ANCHORS

(75) Inventor: Richard Braunstein, Marietta, GA (US)

(73) Assignee: YKK Corporation of America, Marietta, GA (US)

( * ) Notice: Subject to any disclaimer, the term of this patent is extended or adjusted under 35 U.S.C. 154(b) by 128 days.

(21) Appl. No.: 11/524,976

(22) Filed: Sep. 21, 2006

(65) Prior Publication Data

US 2008/0073470 A1 Mar. 27, 2008

(51) Int. Cl.
*E04D 13/18* (2006.01)
*E04H 14/00* (2006.01)

(52) U.S. Cl. .......................................... 52/173.3; 52/74

(58) Field of Classification Search .................... 248/65; 52/173.3, 74, 78, 75, 309.1, 309.2, 309.6, 52/309.7; 160/45, 47, 54, 61

See application file for complete search history.

(56) References Cited

U.S. PATENT DOCUMENTS

| | | | |
|---|---|---|---|
| 3,204,324 A | 9/1965 | Nilsen | |
| 3,367,077 A | 2/1968 | Johnston | |
| 3,729,874 A * | 5/1973 | Albany | 52/78 |
| 3,823,524 A * | 7/1974 | Weinstein | 52/717.02 |
| 3,956,863 A | 5/1976 | Tiedeken | |
| 4,231,207 A * | 11/1980 | Kern et al. | 52/730.3 |
| 4,418,506 A | 12/1983 | Weber et al. | |
| 4,463,540 A * | 8/1984 | Gordon | 52/730.2 |
| 4,650,702 A * | 3/1987 | Whitmyer | 428/31 |
| 4,680,905 A | 7/1987 | Rockar | |
| 4,938,445 A | 7/1990 | Medley | |
| 5,299,395 A | 4/1994 | Smith et al. | |
| 5,355,645 A * | 10/1994 | Farag | 52/235 |
| 6,421,966 B1 | 7/2002 | Braunstein et al. | |
| 6,550,196 B2 | 4/2003 | Braybrook | |
| 7,165,367 B2 * | 1/2007 | Habicht | 52/407.1 |
| 2004/0123550 A1 * | 7/2004 | Hartman | 52/720.1 |
| 2005/0284053 A1 | 12/2005 | Grunewald et al. | |
| 2008/0098665 A1 * | 5/2008 | DeYoung | 52/75 |

OTHER PUBLICATIONS

Kawneer Company, Inc., 1600 SunShade product literature, 2002, 7 pages.

* cited by examiner

*Primary Examiner*—Amy J. Sterling
(74) *Attorney, Agent, or Firm*—Alston & Bird LLP

(57) ABSTRACT

A thermally broken sunshade anchor can attach a sunshade to a mullion of a curtain wall of a building structure. The thermally broken sunshade anchor has a body for connection to the sunshade, a wall attachment member for attachment to the curtain wall, and a thermal break between the body and the wall attachment member. The thermal break is positioned adjacent a thermal break location portion of the body and adjacent a thermal break location portion of the wall attachment member. The thermal break resists heat transfer such that the body and the wall attachment member are substantially thermally isolated from each other by the thermal break. The thermal break can be formed by pour and debridge processes.

11 Claims, 5 Drawing Sheets

THERMALLY BROKEN SUNSHADE ANCHORS

BACKGROUND OF THE INVENTION

Embodiments of the present invention pertain to thermally broken sunshade anchors. The present invention also pertains to sunshade assemblies. Embodiments of the present invention pertain to pour and debridge thermal breaks, particularly for sunshade anchors. The present invention also pertains to methods related to sunshade anchors, sunshade assemblies, and pour and debridge thermal breaks.

Sunshades are often used on the outside of commercial architectural projects or buildings to shade large expanses of glass from sunlight. The sunshades are attached to the exteriors of the buildings and extend outward away from the buildings. The sunshades have louvers which reduce the amount of sunlight that reaches the buildings. The sunshades can mitigate possible solar heat gain to the inside of the buildings from solar light passing through the glass. The energy efficiency and performance of buildings is a concern, due to, for example, rising energy costs and environmental concerns associated with non-renewable energy sources. Architects are specifying products like sunshades to improve the overall energy efficiency and performance of the buildings they design. In many cases, architects are designing curtain wall systems where sunshades are directly integrated into the structural members of the curtain wall (known as mullions).

There are existing curtain wall systems which are thermally broken or thermally improved, i.e., a thermal barrier is included in the curtain wall to reduce heat transfer through the curtain wall components. However, sunshades, sunshade attachment structures and sunshade attachment methods have not been thermally broken. Existing sunshades have been attached to curtain wall mullions by structures having metal-to-metal contact which easily transfer heat energy. A non-thermally broken sunshade, typically made of aluminum, is highly energy conductive and easily transfers heat energy to the mullion of the curtain wall. Furthermore, the sunshades have been attached to the curtain wall mullions with structures which breach the thermal break in the curtain wall. Accordingly, the heat energy can by-pass the thermal break in the curtain wall. The additional heat load placed on the curtain wall by the sunshade is in direct conflict to the energy performance of the overall curtain wall system and may even degrade the heat transfer resistance of the otherwise thermally broken curtain wall.

Curtain walls can be measured by their transmission of energy, known as U-value. Sunshades have been attached to the mullions of the curtain walls by sunshade anchors. However, the sunshade anchors, and thus the sunshades themselves, have not been thermally broken. A non-thermally broken sunshade attached directly to the mullion of the curtain wall increases the U-value of the curtain wall and reduces the energy performance of the wall as well. The non-thermally broken sunshade may also have a negative effect on the energy efficiency of the building. A sunshade is added to a building for the benefit of reducing solar heat energy applied to the building by providing shade to the building. However, the shading benefits of the sunshade may be at least partially offset by the diminished energy performance of the building curtain wall caused by the attachment of the sunshade which is a large metallic appendage. Existing sunshades can negatively impact the curtain wall's U-value to some extent. Therefore, improvements can be made to sunshades, sunshade anchors and related methods.

Thermal breaks have been used to reduce heat transfer through a device. One type of thermal break is a pour and debridge thermal break. A pour and debridge thermal break is formed by pouring urethane resin into a defined volume in the device, and curing the urethane. A bridge is removed which results in two spaced apart components separated from each other by the cured urethane resin. The cured urethane resin forms the thermal break between the two components.

Existing pour and debridge thermal breaks and devices having the thermal breaks can be improved. For example, existing sunshade anchors have not had pour and debridge thermal breaks. Also, a proper bond between the urethane thermal break and aluminum components has been a concern. Pour and debridge thermal breaks have also had problems with dry shrinkage and potentially inadequate shear strength between the thermal break and aluminum components. Therefore, improvements can be made to pour and debridge thermal breaks and related methods.

Accordingly, needs exist to improve sunshades, sunshade anchors, thermal breaks and related methods for the reasons mentioned above and for other reasons.

SUMMARY OF THE INVENTION

The present invention provides new sunshade anchors, sunshades and related methods. In an embodiment of the present invention, a thermally broken sunshade anchor is used to attach a sunshade to a mullion of a curtain wall. The thermally broken sunshade anchor can not only allow the sunshade to provide the positive benefits of shading the building but can also reduce or even effectively eliminate negative impact on the U-value of the curtain wall by a non-thermally broken sunshade. The thermally broken sunshade anchor resists thermal transfer through the curtain wall into and out of the building. One type of thermal break in the sunshade anchor is a pour and debridge thermal break.

In an embodiment of the present invention, a sunshade anchor has a body having a sunshade attachment portion and a thermal break location portion. A thermal break having a resistance to heat transfer is provided adjacent the thermal break location portion of the body. A wall attachment member has a wall attachment portion and a thermal break location portion in which the thermal break location portion of the wall attachment member is adjacent the thermal break. The body and the wall attachment member are substantially thermally isolated from each other by the thermal break.

Further aspects of the embodiment can provide the body and the wall attachment member being substantially not connected to each other except for the thermal break.

A fastener mounting hole may extend through the body, the thermal break and the wall attachment member.

The sunshade anchor may have an interlocking engagement between the body and the thermal break, and may also have an interlocking engagement between the wall attachment member and the thermal break.

The wall attachment member may have an elongated base portion having the thermal break location portion of the wall attachment member. An appendage may protrude from the base portion along a longitudinal centerline of the base portion and in a direction away from the thermal break. The appendage may have an enlarged engagement head.

The body may have a base having the thermal break location portion of the body. The sunshade attachment portion may have first and second arms extending from the base and spaced apart from each other.

The thermal break may be in direct contact with at least one of the thermal break location portion of the body and the thermal break location portion of the wall attachment member.

The thermal break and the wall attachment member may be made together as a unitary, one-piece thermal break.

In an embodiment of the present invention, a sunshade for mounting to a building structure has a sunshade anchor which mounts to the building structure. The sunshade anchor has a thermal break that substantially resists thermal energy from passing through the entire sunshade anchor to the building structure. The sunshade has first and second outriggers extending from the sunshade anchor and spaced apart from each other. The sunshade also has a plurality of louvers extending from the first outrigger to the second outrigger.

The sunshade anchor may have a channel body connected to the first and second outriggers, and a wall attachment member in contact with the building structure. The channel body and the wall attachment member can be substantially thermally isolated from each other by the thermal break. The thermal break can be a pour and debridge thermal break.

In an embodiment of the present invention, a first device can mount a second device to a mullion of a building curtain wall, the mullion having an external glass capture member connected thermally broken to an interior mullion member. The first device has a second device attachment portion for attachment to the second device. The first device also has a mullion attachment portion for contact with the interior mullion member of the mullion, and a thermal break having a resistance to heat transfer. The thermal break is located between the second device attachment portion and the mullion attachment portion such that the second device attachment portion and the mullion attachment portion are substantially thermally isolated from each other by the thermal break.

The first device can be a sunshade anchor and the second device can be a sunshade. The thermal break can be a pour and debridge thermal break.

In an embodiment of the present invention, a method of making a sunshade anchor includes providing an anchor member having a wall attachment member separated from a sunshade attachment portion by a resin-receiving pocket; flowing resin into the resin-receiving pocket; curing the resin to form a heat transfer resistant thermal break; and removing a bridge of the resin-receiving pocket from the anchor member.

The step of providing an anchor member may further include extruding the wall attachment member, the bridge, and the sunshade attachment portion as a one-piece extrusion.

In an embodiment of the present invention, a method of reducing thermal energy applied to a curtain wall of a building by a sunshade includes attaching the sunshade to a mullion of the curtain wall with a thermally broken sunshade anchor.

The method may further include attaching the thermally broken sunshade anchor to an interior mullion member without providing a significant heat transfer path from the sunshade through the thermally broken sunshade anchor to the interior mullion member.

The method may further include forming a thermal break in the thermally broken sunshade anchor by a pour and debridge process.

Features of the present invention are described in an embodiment of a sunshade anchor. However, the present invention is broader than sunshade anchors and not limited to sunshade anchors. Embodiments of the present invention may have various features and provide various advantages.

Any of the features and advantages of the present invention may be desired, but, are not necessarily required to practice the present invention.

Advantages of the present invention can be to provide new sunshade anchors, sunshades and related methods.

Another advantage of the present invention can be to provide thermally broken sunshade anchors.

Another advantage of the present invention can be to provide thermally broken sunshades.

A further advantage of the present invention can be to reduce negative thermal impact on curtain walls and/or buildings by sunshades.

Yet another advantage of the present invention can be to provide improved devices having pour and debridge thermal breaks.

Other advantages may include providing new methods related to sunshade anchors, sunshades and thermal breaks.

Additional features and advantages of the present invention are described in, and will be apparent from, the following Detailed Description of the Invention and the figures.

DETAILED DESCRIPTION OF THE INVENTION

Figure 1:
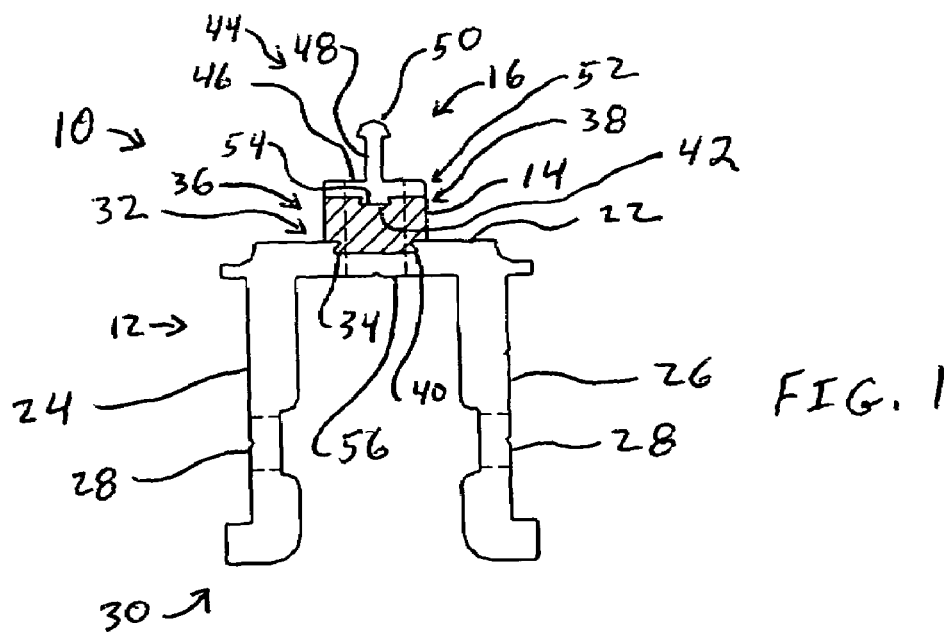
FIG. 1 is an end view of a sunshade anchor according to the present invention.
Figure 2:
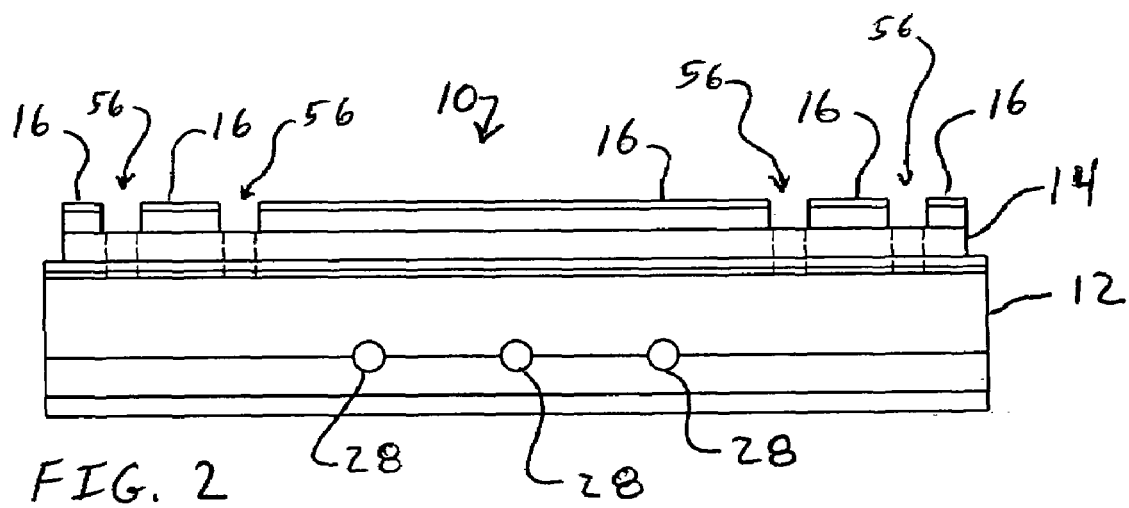
FIG. 2 is a right side view of the sunshade anchor of FIG. 1.
Figure 3:
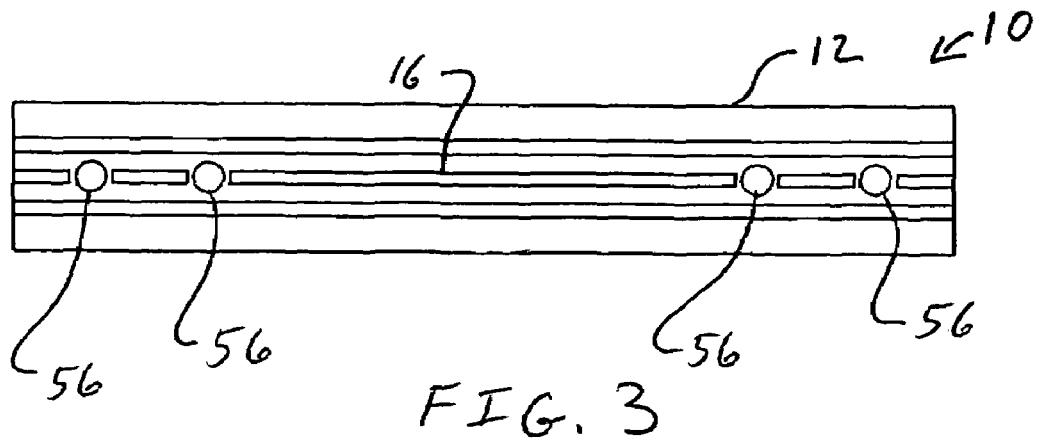
FIG. 3 is a top view of the sunshade anchor of FIG. 2.
Figure 4:
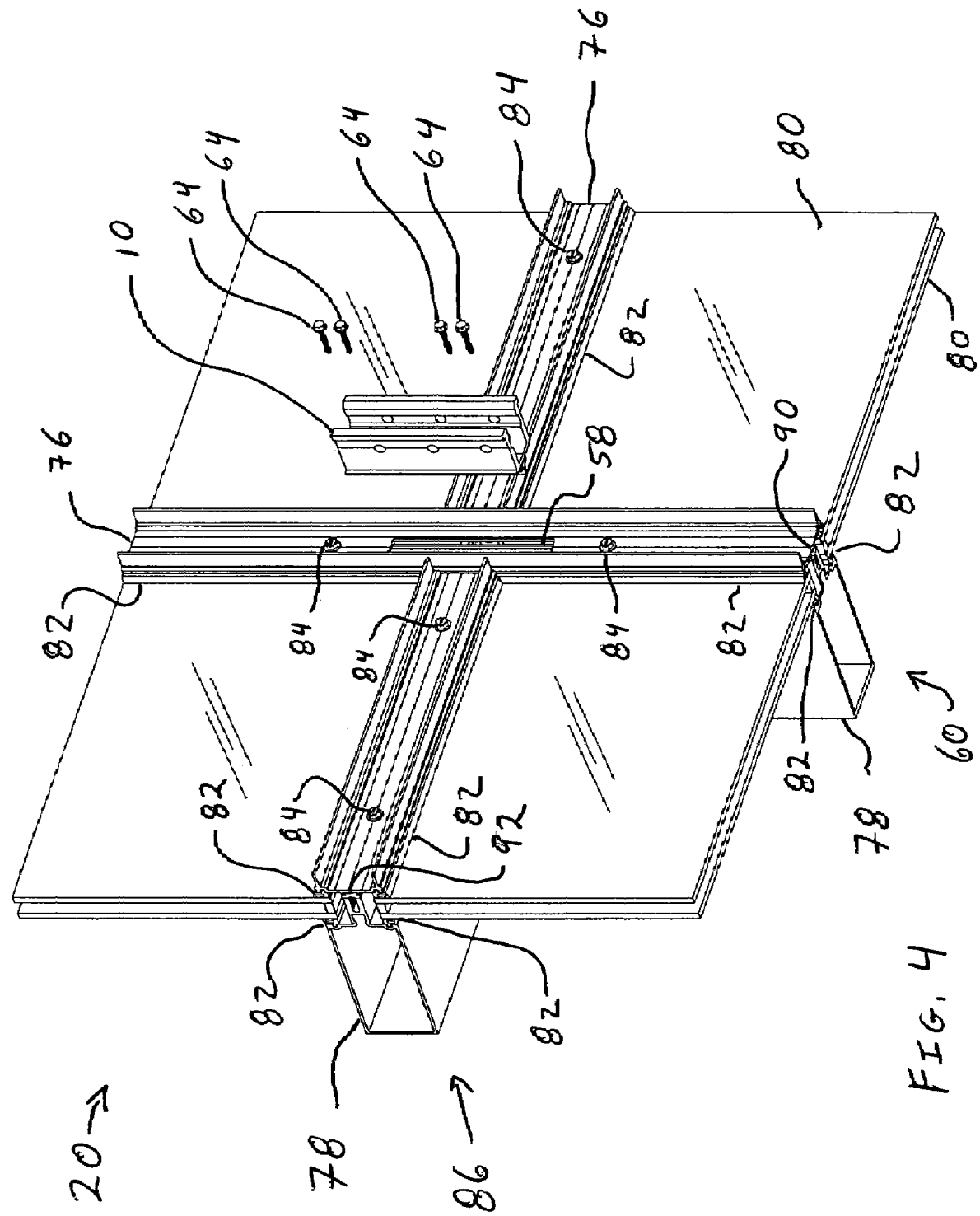
FIG. 4 is a perspective view of the sunshade anchor of FIG. 1 exploded from a curtain wall.

One example of a thermally broken sunshade anchor 10 according to the present invention is shown in FIGS. 1-3. The thermally broken sunshade anchor 10 has a body 12, a thermal break 14 and a wall attachment member 16. The thermally broken sunshade anchor 10 attaches a sunshade 18 to a curtain wall 20 as shown in FIGS. 4-7. The thermally broken sunshade anchor 10 securely fastens the sunshade 18 in a cantilevered manner to the curtain wall 20 with sufficient strength to overcome at least combined wind loads, dead loads and snow loads applied to the sunshade 18.

Referring to FIGS. 1-3, the body 12 of the thermally broken sunshade anchor 10 has a base 22 and arms 24, 26, each arm extending from opposite edge portions of the base 22. The example of the body 12 is shown as having a channel shape; however, the body 12 can have any shape or structure as desired. Mounting holes 28 are provided in each of the arms 24, 26. The channel body 12 has a sunshade attachment portion 30 formed by the arms 24, 26 for attachment to the sunshade 18. The channel body 12 also has a thermal break location portion 32 on a side of the base 22 opposite the sunshade attachment portion 30. The thermal break location portion 32 of the channel body 12 is adjacent to or, as one alternative, directly contacts the thermal break 14. The thermal break location portion 32 has a recess 34 having a narrow opening at an outer surface of the base 22 and an enlarged portion at an interior of the base 22 for the thermal break 14. Preferably, the channel body 12 is made of extruded aluminum, although the present invention can be practiced using other materials as desired.

The thermal break 14 is a device positioned between two materials which resists heat transfer between those two materials. For example, the thermal break 14 is positioned along a heat transfer path between two heat-conductive materials, such as aluminum materials, and resists heat transfer along the path. In an embodiment of the present invention, the thermal break 14 is a device which provides a significant resistance to thermal energy transfer between the channel body 12 and the wall attachment member 18. The thermal break 14 has a first contact portion 36 on one side and a second contact portion 38 on an opposite side. The first contact portion 36 of the thermal break 14 is adjacent to or, as one alternative, directly contacts the thermal break location portion 32 of the channel body 12. In the example shown in FIGS. 1-3, the first contact portion 36 of the thermal break 14 has a protrusion 40 having an enlarged distal portion and a narrowed inward portion. The shape of the protrusion 40 of the first contact portion 36 of the thermal break 14 conforms to the shape of the recess 34 of the thermal break location portion 32 of the channel body 12. As shown in FIGS. 1-3, the thermal break 14 extends along a longitudinal centerline of the channel body 12 and the thermally broken sunshade anchor 10.

The second contact portion 38 of the thermal break 14 has recess 42 having a narrow opening at an outer surface of the thermal break 14 and an enlarged portion at an interior of the thermal break 14. The second contact portion 38 of the thermal break 14 is for the wall attachment member 16 as discussed below.

The thermal break 14 is made of a material that has a high resistance to heat transfer. The heat transfer resistance of the thermal break 14 provides a substantially high barrier to heat transfer between the channel body 12 and the wall attachment member 16. In other words, the channel body 12 and the wall attachment member 16 are substantially thermally isolated from each other by the thermal break 14. One thermal break 14 suitable for use with the present invention is a pour and debridge thermal break. Although, the present invention can be practiced using other types of thermal breaks as desired. One type of material suitable for use in the thermal break is polyurethane resin. However, any other material which provides resistance to thermal energy transfer may be suitable for use in the thermal break, for example polyamide materials and plastics materials. The pour and debridge thermal break 14 is described further below.

The wall attachment member 16 has a wall attachment portion 44 and an elongated base portion 46. The elongated base portion 46 has an appendage 48 protruding from the base portion 46. The appendage 48 protrudes from the base portion 46 along a longitudinal centerline of the base portion 46 and in a direction away from the thermal break 14. The appendage 48 has an enlarged engagement head 50 for engagement with the curtain wall 20. The wall attachment member 16 also has the thermal break location portion 52 on the base portion 46 of the wall attachment member 16. The thermal break location portion 52 is adjacent to or, as one alternative, directly contacts the second contact portion 38 of the thermal break 14. The thermal break location portion 52 of the wall attachment member 16 has a protrusion 54 having an enlarged distal portion and a narrowed inward portion. The shape of the protrusion 54 of the thermal break location portion 52 of the wall attachment member 16 conforms to the shape of the recess 42 of the second contact portion 38 of the thermal break 14. Preferably, the wall attachment member 16 is made of extruded aluminum, although the present invention can be practiced using other materials as desired.

In an embodiment of the present invention, the thermal break 14 and the wall attachment member 16 can be made together, as a unitary, one-piece thermal break. For example both the thermal break 14 and the wall attachment member 16 could be made out of the same thermal break material.

Mounting holes 56 extend through the thermally broken sunshade anchor 10 for fasteners which mount the sunshade anchor 10 to the curtain wall 20. The mounting holes extend through the base 22 of the channel body 12, the thermal break 14 and the wall attachment member 16.

Figure 5:
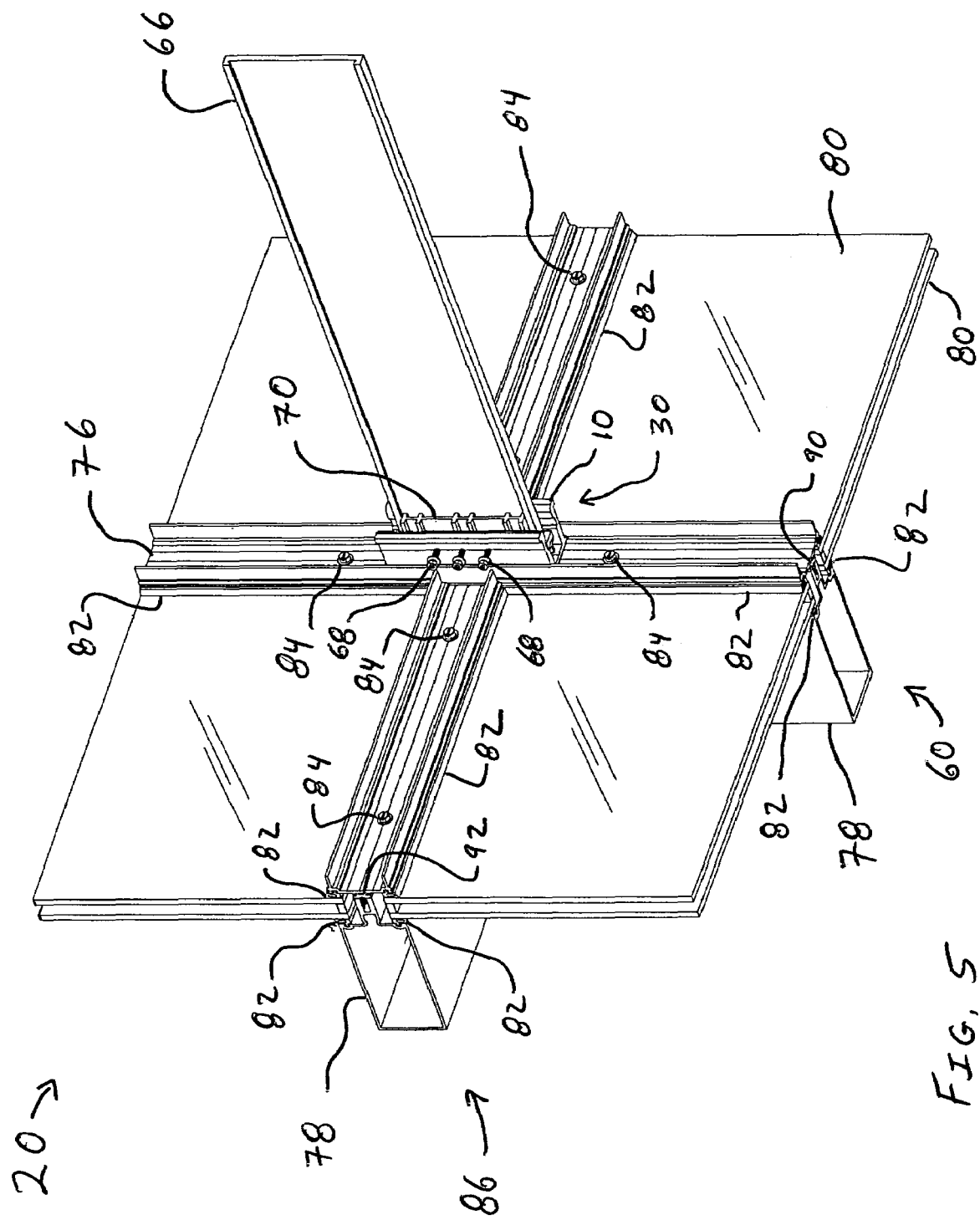
FIG. 5 is a perspective view showing the sunshade anchor attached to a curtain wall mullion of the curtain wall and a sunshade outrigger attached to the sunshade anchor.
Figure 6:
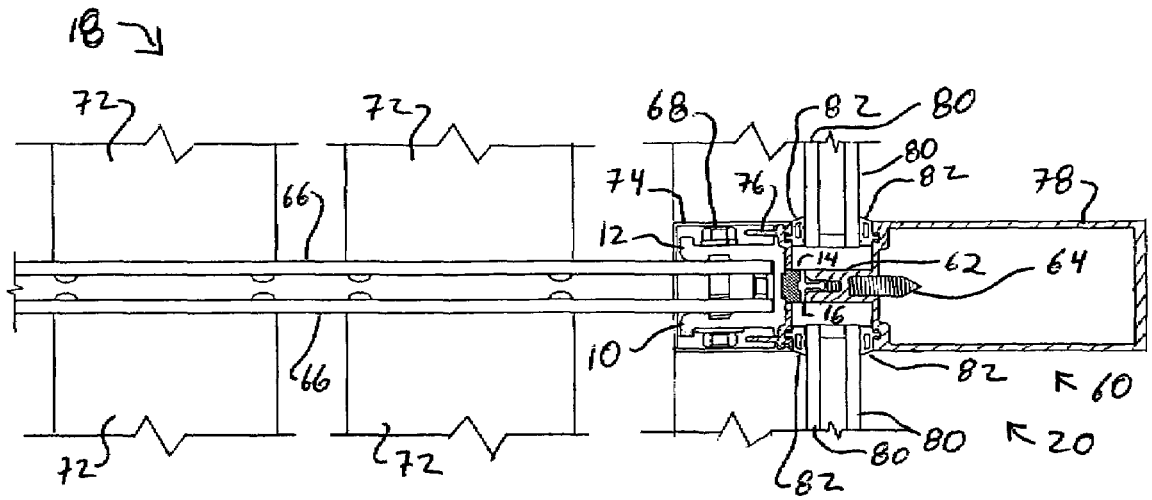
FIG. 6 is a partial cross-sectional top view of a sunshade assembly attached to the curtain wall.
Figure 7:
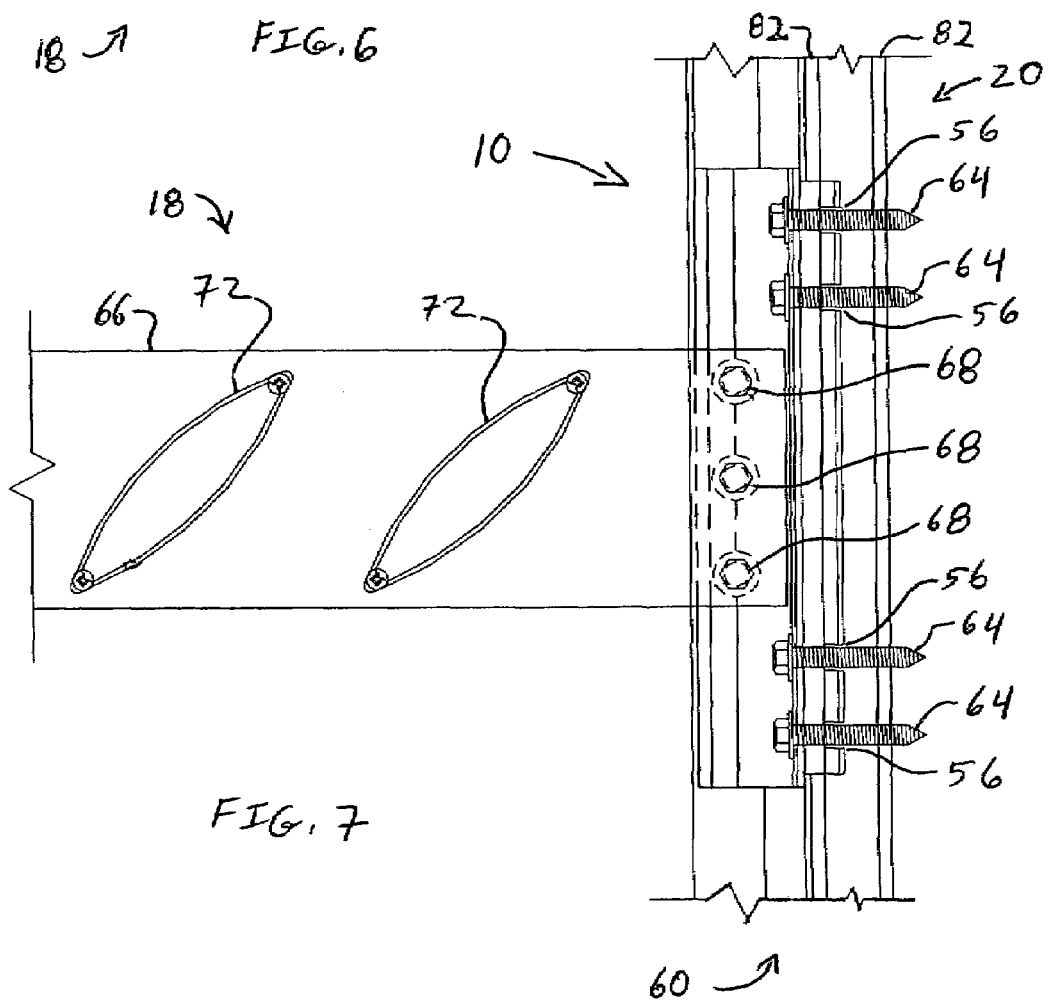
FIG. 7 is a partial side view of the sunshade assembly attached to the curtain wall of FIG. 6.

Referring to FIGS. 4-7, the thermally broken sunshade anchor 10 is attached to the curtain wall 20 by aligning the sunshade anchor 10 with a notch 58 (FIG. 4) in a vertical mullion 60 of the curtain wall 20. The wall attachment member 16 is inserted through the notch 58 and the appendage 48 of the wall attachment member 16 is inserted into a tongue 62 (FIG. 6). Fasteners 64 are inserted through the mounting holes 56 and securely mount the thermally broken sunshade anchor 10 to the vertical mullion 60 as shown in FIGS. 6 and 7. The channel body 12 and the wall attachment member 16 are not connected to each other except for the thermal break 14. Accordingly, thermal heat energy cannot easily pass between the channel body 12 and the wall attachment member 16 because the thermal break 14 significantly resists heat transfer.

The sunshade 18, which is typically orientated horizontally on the building, is attached to two spaced-apart thermally broken sunshade anchors 10 which are mounted to two spaced-apart vertical mullions 60. FIG. 5 shows one of the two sunshade anchors 10 mounted to an outrigger 66 of the sunshade 18. The outrigger 66 is attached to the sunshade attachment portion 30, particularly the arms 24, 26, of the thermally broken sunshade anchor 10 by fasteners 68. A second outrigger 66 of the sunshade 18 is similarly attached to the other thermally broken sunshade anchor 10. When two sunshades 18 are positioned side-by-side of each other in a sunshade array another outrigger 66 can also be attached to the sunshade anchor 10 such that two outriggers 66 are attached to the same sunshade anchor 10. See FIG. 6. A spacer 70, described below, is omitted from FIG. 6 for clarity of the other components. Referring back to FIG. 5, FIG. 5 shows only one outrigger 66 attached to the sunshade anchor 10 to show the spacer 70 more clearly. Instead of attaching another outrigger 66 to the sunshade anchor 10, a sunshade end cover piece (not shown) can be attached to the sunshade anchor 10 as the end of the sunshade 18. The spacer 70 is provided between two outriggers 66, 66 or between one outrigger 66 and the sunshade end cover piece (not shown) and mounted to the sunshade attachment portion 30. The sunshade 18 also has a plurality of louver blades 72 in which opposite ends of the louver blades 72 are attached to the outriggers 66, 66 which are attached to the two spaced apart thermally broken sunshade anchors 10, 10. Referring to FIGS. 6 and 7, a cover 74 can be provided to enclose the attachment structure of the thermally broken sunshade anchor 10 and the sunshade 18. The outriggers 66, louver blades 72, spacers 70 and cover 74 can be made of extruded aluminum, for example.

Referring to FIGS. 4-8, the vertical mullion 60 of the curtain wall 20 has a pressure plate 76 mounted to an interior mullion member 78 on opposite sides of glass panels 80. The pressure plate 76 is a component of the curtain wall 20 that captures the glass panels 80, i.e., an external glass capture member. Gaskets 82 are provided between the pressure plate 76 and the glass panels 80. Gaskets 82 are also provided between the glass panels 80 and the interior mullion member 78. Fasteners 84 securely mount the pressure plate 76, the glass panels 80, the gaskets 82, and the interior mullion member 78 together. Horizontal mullions 86 (FIG. 5) are constructed similar to the vertical mullions 60. The curtain wall 20 of FIGS. 4-8 includes the vertical mullions 60, the horizontal mullions 86, the glass panels 80, and the gaskets 82. The mullions 60, 86 include the interior mullion member 78 and the exterior pressure plates 76. However, the present invention can be practiced with other curtain walls having structures different than the curtain wall 20. For example, the present invention can be practiced with other curtain walls that have glass capture members that are different than the pressure plate 76.

Referring to FIGS. 1 and 6, the tongue 62 of the interior mullion member 78 is in contact with the wall attachment member 16 of the thermally broken sunshade anchor 10. However, the thermal break 14 of the sunshade anchor 10 substantially thermally insolates the interior mullion member 78 and the wall attachment member 16 from the pressure plate 76 and the channel body 12. In other words, the thermally broken sunshade anchor 10 and the sunshade 18 are thermally broken from the interior mullion member 78 and the curtain wall 20 by the thermal break 14. Accordingly, thermal heat energy cannot easily pass between the sunshade 18, the sunshade anchor 10, the interior mullion member 78, and the curtain wall 20 because the thermal break 14 significantly resists heat transfer. The fasteners 64 are in contact with the channel body 12 and the interior mullion member 78 when the sunshade anchor 10 is mounted to the curtain wall 20. However, the fasteners 64 do not provide a significant heat transfer path between the thermally broken sunshade anchor 10 and the interior mullion member 78.

Figure 8:
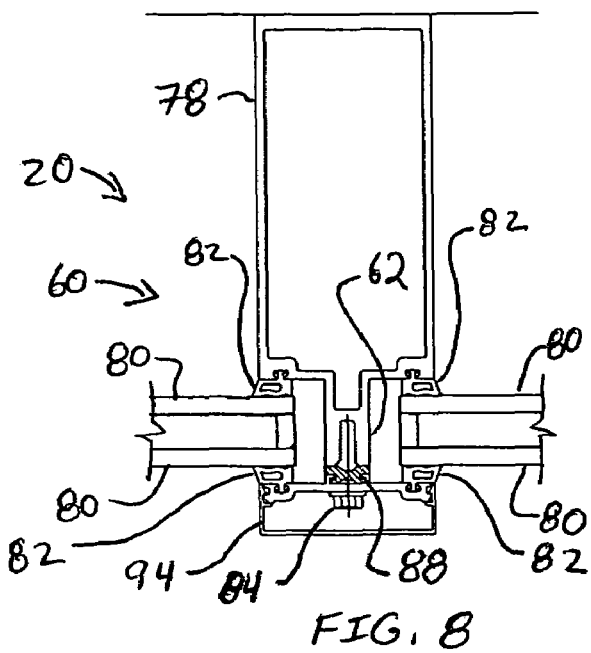
FIG. 8 is cross-sectional top view of the curtain wall in an area without the sunshade anchor.

Referring to FIGS. 5 and 8, the curtain wall 20 has a thermal break 88 which extends along the lengths of the vertical mullion 60. The mullion thermal break 88 is located at a thermal break location 90 which runs along the side of the pressure plate 76 facing the interior mullion member 78. Referring also to FIG. 6, the thermal break 14 of the sunshade anchor 10 is aligned vertically with the mullion thermal break 88. However, the vertical mullion thermal break 88 is omitted along the length of the sunshade anchor thermal break 14. Referring to FIG. 5, the horizontal mullion 86 also has a mullion thermal break (not shown) like the mullion thermal break 88. The horizontal mullion thermal break is provided at a thermal break location 92 that runs along the horizontal mullion 86. A cover 94 (FIG. 8) is provided to cover the pressure plate 76 of the vertical and horizontal mullions 60, 86.

Figure 9:
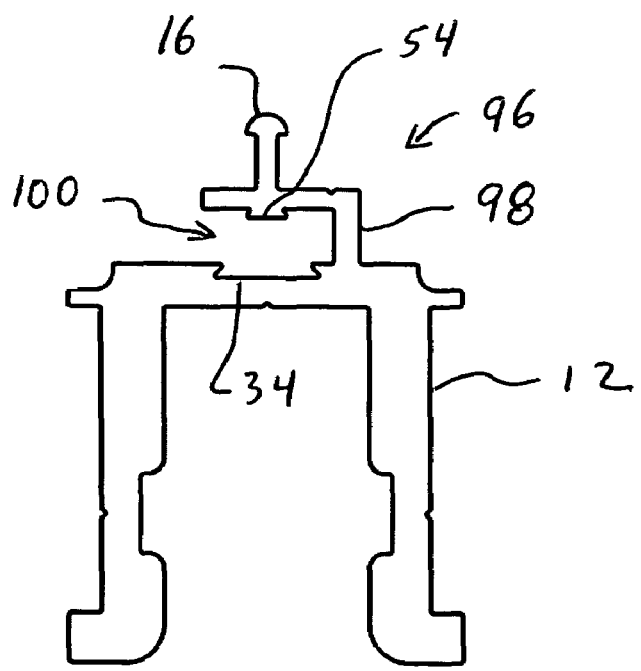
FIG. 9 is an end view of the sunshade anchor of FIG. 1 prior to a pour and debridge process.

A method of making the thermally broken sunshade anchor 10 will now be further described with reference to FIGS. 1 and 9. FIG. 9 shows an extruded aluminum anchor member 96 prior to a thermal break pour and debridge process. The anchor member 96 has the channel body 12, the wall attachment member 16 and a bridge 98. The bridge 98 is connected to and extends between the channel body 12 and the wall attachment member 16 as a one-piece extrusion. The thermal break location portion 32 of the channel body 12, the bridge 98, and the thermal break location portion 52 of the wall attachment member 16 form a pocket 100 for the thermal break 14.

The material for the thermal break 14, such polyurethane resin in fluid form, is poured into the pocket 100. After the polyurethane resin cures to form the thermal break 14, the bridge 98 is removed from the anchor member 96 by a debridging process. FIG. 1 shows the thermally broken sunshade anchor 10 after the debridging process of removing the bridge 98. The process of making the thermal break 14 is a pour and debridge process. Pour and debridge thermal breaks and methods of pouring and debridging are generally known. However, embodiments of the present invention are improvements of existing pour and debridge thermal breaks and pour and debridge processes for sunshade anchors.

The thermally broken sunshade anchor 10 provides for secure contact between the thermal break 14 and the channel body 12 and the wall attachment member 16. Referring to FIGS. 6 and 7, the thermal break 14 is held in significant compression when the sunshade anchor 10 is mounted to the mullion 60 by the fasteners 64. The significant compression of the thermal break 14 prevents the channel body 12, the thermal break 14 and the wall attachment member 16 from sliding or moving relative to each other. Furthermore, the thermal break 14 is interlocked with the thermal break location portion 32 of the channel body 12 by the protrusion 40 being engaged with the recess 34. Similarly, the thermal break 14 is interlocked with the thermal break location portion 52 of the wall attachment member 16 by the protrusion 54 being engaged with the recess 42.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A sunshade anchor, comprising:
    a body having a sunshade attachment portion and a thermal break location portion, the sunshade attachment portion comprising at least one arm, said at least one arm being cantilevered outwardly from the body along an axis that extends through the body;
    a thermal break having a resistance to heat transfer, the thermal break being disposed adjacent the thermal break location portion of the body;
    a wall attachment member having a wall attachment portion and a thermal break location portion, the thermal break location portion of the wall attachment member being disposed adjacent the thermal break, and the wall attachment portion extending outwardly from the thermal break location portion in a direction substantially parallel to the axis and opposite the at least one arm of the sunshade attachment portion; and
    a fastener mounting hole extending through the body, the thermal break and the wall attachment member;
    wherein the body and the wall attachment member are substantially thermally isolated from each other by the thermal break.

2. The sunshade anchor of claim 1, wherein the body and the wall attachment member are substantially not connected to each other except for the thermal break.

3. The sunshade anchor of claim 1, further comprising:
    an interlocking engagement between the body and the thermal break; and
    an interlocking engagement between the wall attachment member and the thermal break.

4. The sunshade anchor of claim 1, wherein:
    the thermal break location portion of the wall attachment member comprises an elongated base portion,
    the wall attachment portion comprises at least one appendage protruding from the elongated base portion in the direction substantially parallel to the axis and opposite the at least one arm of the sunshade attachment portion, and each appendage protrudes from the base portion along a longitudinal centerline of the base portion and each appendage has at least one enlarged engagement head.

5. The sunshade anchor of claim 1, wherein the sunshade attachment portion further comprises first and second arms extending from the base and spaced apart from each other, wherein the axis is a first axis, the first arm extends along the first axis, and the second arm extends along a second axis, and wherein the first axis is substantially parallel to the second axis.

6. The sunshade anchor of claim 1, wherein the thermal break is in direct contact with at least one of the thermal break location portion of the body and the thermal break location portion of the wall attachment member.

7. The sunshade anchor of claim 1, wherein the thermal break and the wall attachment member are made together as a unitary, one-piece thermal break.

8. A sunshade for mounting to a building structure, comprising:

first and second sunshade anchors which mount to the building structure, the sunshade anchors each having a thermal break a first outrigger extending from the first sunshade anchor and a second outrigger extending from the second sunshade anchor, the first and second outriggers being spaced apart from each other, and the first and second outriggers being cantilevered outwardly from the sunshade anchors in a direction substantially parallel to an axis extending between an exterior side of the building structure and an interior side of the building structure; and a plurality of louvers, each louver extending from the first outrigger to the second outrigger, wherein each sunshade anchor comprises:

a channel body connected to the first and second outriggers, and a wall attachment member configured for contacting the building structure, the wall attachment member extending outwardly from the sunshade anchor in a direction substantially opposite the first and second outriggers and substantially parallel to the axis, and wherein the channel body and the wall attachment member are substantially thermally isolated from each other by the thermal break.

9. The sunshade anchor of claim 1, wherein:

the thermal break location portion of the wall attachment member comprises an elongated base portion, and the wall attachment portion comprises at least one appendage protruding from the elongated base portion in the direction substantially parallel to the substantially horizontal axis and opposite the at least one arm of the sunshade attachment portion.

10. The sunshade anchor of claim 1 wherein the axis is a substantially horizontal axis, and the wall attachment portion comprises at least one appendage protruding from the elongated base portion in the direction substantially parallel to the substantially horizontal axis and opposite the at least one arm of the sunshade attachment portion.

11. The sunshade anchor of claim 1 wherein the axis is a substantially horizontal axis.

\* \* \* \* \*